United States Patent
Henry et al.

(10) Patent No.: US 11,753,258 B2
(45) Date of Patent: Sep. 12, 2023

(54) SOLIDS CONVEYING WITH MULTI-DIAMETER PIPING CIRCUIT

(71) Applicant: Braskem America, Inc., Philadelphia, PA (US)

(72) Inventors: Shady Henry, La Porte, TX (US); Ronald Lutz, Pasadena, TX (US)

(73) Assignee: Braskem America, Inc., Philadelphia, PA (US)

( * ) Notice: Subject to any disclaimer, the term of this patent is extended or adjusted under 35 U.S.C. 154(b) by 0 days.

(21) Appl. No.: 17/482,839

(22) Filed: Sep. 23, 2021

(65) Prior Publication Data
US 2022/0009728 A1 Jan. 13, 2022

Related U.S. Application Data

(63) Continuation of application No. 16/904,334, filed on Jun. 17, 2020, now Pat. No. 11,161,699.

(60) Provisional application No. 62/863,040, filed on Jun. 18, 2019.

(51) Int. Cl.
*B65G 53/52* (2006.01)
*B65G 53/06* (2006.01)

(52) U.S. Cl.
CPC ........... *B65G 53/06* (2013.01); *B65G 53/528* (2013.01)

(58) Field of Classification Search
None
See application file for complete search history.

(56) References Cited

U.S. PATENT DOCUMENTS

| | | | | |
|---|---|---|---|---|
| 2,326,438 A | * | 8/1943 | Clarke | B01J 8/1863 208/158 |
| 2,364,199 A | * | 12/1944 | Derr | F41H 9/06 417/174 |
| 2,919,159 A | * | 12/1959 | Lacroix | B65G 53/00 406/137 |
| 2,919,160 A | * | 12/1959 | Blackburn | B65G 53/22 406/134 |

(Continued)

FOREIGN PATENT DOCUMENTS

| | | | | |
|---|---|---|---|---|
| GB | 1567954 A | * | 5/1980 | ............. B65G 53/52 |
| GB | 1567954 A | | 5/1980 | |
| JP | S56149919 A | | 11/1981 | |

OTHER PUBLICATIONS

International Search Report and Written Opinion of PCT Application No. PCT/US2020/038465 dated Sep. 24, 2020, 10 pages.

(Continued)

*Primary Examiner* — Joseph A Dillon, Jr.
(74) *Attorney, Agent, or Firm* — Bracewell LLP; Keith R. Derrington

(57) ABSTRACT

A mixture of gas and solid particles are conveyed through a piping circuit connected between initial and terminal points. The gas is introduced at the initial point and the particles are introduced between the initial and terminal points. A diameter of the piping circuit increases downstream of where the particles are introduced, and a velocity of the gas is at least as great as a pick-up velocity of the particles at the point where the particles are introduced into the piping circuit. In addition to the above constraints, the piping circuit is sized so that total pressure losses due to flow in the piping circuit between the initial and terminal points are within a designated amount.

8 Claims, 1 Drawing Sheet

(56) References Cited

U.S. PATENT DOCUMENTS

| | | | | |
|---|---|---|---|---|
| 2,978,279 A * | 4/1961 | Bergstrom | B01J 8/0025 | 406/174 |
| 3,295,895 A * | 1/1967 | Latham, Jr. | B65G 53/00 | 406/137 |
| 3,337,273 A * | 8/1967 | Farnworth | B65G 53/521 | 406/195 |
| 3,380,780 A * | 4/1968 | Allen | B65G 53/525 | 406/50 |
| 3,591,238 A * | 7/1971 | Titus | B65G 53/30 | 406/197 |
| 3,782,695 A * | 1/1974 | Sandiford | B01F 23/59 | 366/178.2 |
| 3,893,655 A * | 7/1975 | Sandiford | B01F 25/85 | 366/114 |
| 4,197,037 A * | 4/1980 | Dede | B65G 53/24 | 406/128 |
| 4,260,298 A * | 4/1981 | Zenz | B01J 8/0015 | 406/146 |
| 4,327,055 A * | 4/1982 | Luckenbach | C10G 11/18 | 422/219 |
| 4,490,077 A * | 12/1984 | Shimada | G01G 13/2851 | 406/146 |
| 4,521,139 A * | 6/1985 | Kretschmer | C21B 5/003 | 406/142 |
| 4,900,200 A * | 2/1990 | Harumoto | B65G 53/26 | 406/122 |
| 4,976,755 A * | 12/1990 | Dewitz | B01J 8/008 | 48/DIG. 4 |
| 5,447,571 A * | 9/1995 | Kuchner | C21B 5/003 | 451/39 |
| 5,908,032 A * | 6/1999 | Poindexter | A24B 3/182 | 406/173 |
| 6,227,768 B1 * | 5/2001 | Higuchi | B65G 53/521 | 406/89 |
| 6,290,266 B1 * | 9/2001 | Kawano | F16L 43/001 | 285/125.1 |
| 8,075,227 B2 * | 12/2011 | Yuan | B01J 8/003 | 422/291 |
| 8,651,773 B2 * | 2/2014 | Funk | B65G 53/66 | 406/197 |
| 8,747,029 B2 * | 6/2014 | Thorn | B65G 53/66 | 406/197 |
| 8,905,681 B2 * | 12/2014 | Schneider | B65G 53/06 | 406/173 |
| 9,694,993 B2 * | 7/2017 | Revega | F17D 3/01 | |
| 2009/0148244 A1 * | 6/2009 | Snowdon | B65G 53/66 | 406/28 |
| 2010/0034599 A1 * | 2/2010 | Snowdon | B01J 8/004 | 406/12 |
| 2010/0150668 A1 * | 6/2010 | Naunheimer | B01J 8/003 | 406/191 |
| 2010/0150669 A1 * | 6/2010 | Naunheimer | B01J 8/003 | 406/197 |
| 2011/0194905 A1 * | 8/2011 | Murayama | C10L 3/06 | 406/14 |
| 2012/0318394 A1 * | 12/2012 | Hu | B65G 53/52 | 138/37 |
| 2020/0283929 A1 * | 9/2020 | Bueno | D01D 13/00 | |
| 2021/0078807 A1 * | 3/2021 | Bullivant | B65G 47/19 | |

OTHER PUBLICATIONS

ESPACENET English Translation for patent JPS56149919 issued on Nov. 20, 1981, 6 pages.

Hilgraf, "Pneumatische foerderung—Ein ueberblick, Teil 2," ZKG International—Zement—Kalk—Gips International, Vauverlag BC GmBH, Germany, vol. 46(3), Mar. 1, 1993: pp. 141-148.

* cited by examiner

SOLIDS CONVEYING WITH MULTI-DIAMETER PIPING CIRCUIT

CROSS-REFERENCE TO RELATED APPLICATION

This application is a continuation in part of and claims priority to and the benefit of co-pending U.S. patent application Ser. No. 16/904,334, filed Jun. 17, 2020, which claimed priority from U.S. Provisional Application Ser. No. 62/863,040, filed Jun. 18, 2019, the full disclosure of which are incorporated by reference herein in their entireties and for all purposes.

BACKGROUND OF THE INVENTION

1. Field of Invention

The present disclosure relates to a system and method for conveying a mixture of particles dispersed in a gas.

2. Description of Prior Art

Particulate material is sometimes conveyed through piping, and is dispersed in a pneumatic stream or another vapor. These types of conveying systems are usually referred to as either a dilute phase system or a dense phase system. Dilute phase conveying systems often meter particulate material into the piping from a hopper or other retainer. A standard blower, compressor, or pressure from a process delivers a high volume of air (or inert gas) at a low pressure, typically not exceeding 15 psig, which is used to convey a low volume of particulate material. The stream travels at high velocities to keep the particulates suspended in the flowing medium. In dilute phase conveying systems, the particulate material being conveyed is usually very free flowing, and the solids loadings is relatively low, typically on the order of 5 to 15 pounds of particulate material per pound of gas. Dilute phase systems usually convey non-abrasive and non-fragile materials that have low densities, such as flour, potato starch, cornstarch, calcium carbonate, hydrated lime, activated carbon, zinc oxide or other solids.

Dense phase conveying systems are generally characterized by lower inert gas velocities and much higher conveying pressures operating in a continuous batch mode. Dense phase conveying systems are typically used to convey abrasive and/or friable material, such as silica sand, fly ash, alumina, carbon black, cocoa beans, hazel nuts, corn, plastic pellets, puffed rice, or solids particles that soften at temperatures generated in a convey system. In such systems, a containment vessel is filled (typically by gravity feed) with the particulate material, sealed, and then pressurized to the desired high pressure. Subsequent release of the pressure discharges the material and propels it along the conveying pipe to its intended destination. The stream travel at velocity typically between 1000 and 3000 ft/min, and the conveying pressure may be as high as 60 psig. In contrast to dilute phase conveying systems, dense phase conveying systems utilize higher ratios of particulate material to the amount of gas used and thus have higher solids loading. In a dilute phase system the stream velocities are to be maintained at a level to ensure the particles are suspended in the gas and moved through the piping.

SUMMARY OF THE INVENTION

Disclosed herein is a method of conveying solid particles in a piping circuit that includes flowing a mixture of the solid particles and a gas in a first portion of the piping circuit, and at a velocity at least as great as a pick up velocity of the particles, directing the mixture into a second portion of the piping circuit having a flow area greater than a flow area of the first portion of the piping circuit, and in which a velocity of the mixture is at least as great as a saltation velocity of the particles, and directing the mixture through the second portion of the piping circuit to a terminal location. In an example the gas is a process gas or a mixture of an injection gas and a carrier gas. Alternatively, the carrier gas and the particles are introduced into the first portion from a process vessel. In one example the first and second portions are within a closed system, and an initial point of the first portion and the terminal location are at a designated pressure. In an alternative to this example the flow areas are sized so that dynamic pressure losses in the first and second portions are less than a pressure differential between the initial point and the terminal location. In an embodiment the particles include a solid polymer, and optionally the gas is hydrocarbon gas.

Also disclosed herein is a piping circuit for conveying particles that is made up of a first segment having, a junction in communication with a source of particles, a first flow path having a flow of motive gas, the flow path having a cross sectional area strategically sized so that when the particles and gas are flowing along the flow path, the particles are at a velocity at least as great as a pick up velocity of the particles. The piping circuit of this example includes a second segment having, a second flow path having an upstream end in communication with the first flow path, a terminal end distal from the upstream end, and a cross sectional area greater than the cross sectional area of the first flow path and strategically sized so that when the motive gas and the particles flow through the second segment the particles are at a velocity at least as great as a saltation velocity of the particles. In an example, the gas is a process gas. In an embodiment the junction is in communication with a discharge line from a process vessel, and the process vessel is the source of the particles. In an alternative to this example the process vessel contains a second gas that flows with the particles to the junction. Embodiments exist where pressures at the junction and at the terminal end are fixed, and a flow rate of the gas and particles are fixed, and where the cross sectional areas of the first and second segments are sized so that a pressure drop in the first and second segments is no greater than a difference in pressure between fixed pressures. The terminal end is optionally at an elevation greater than the junction.

BRIEF DESCRIPTION OF DRAWINGS

Some of the features and benefits of the present invention having been stated, others will become apparent as the description proceeds when taken in conjunction with the accompanying drawings, in which.

Figure 1:
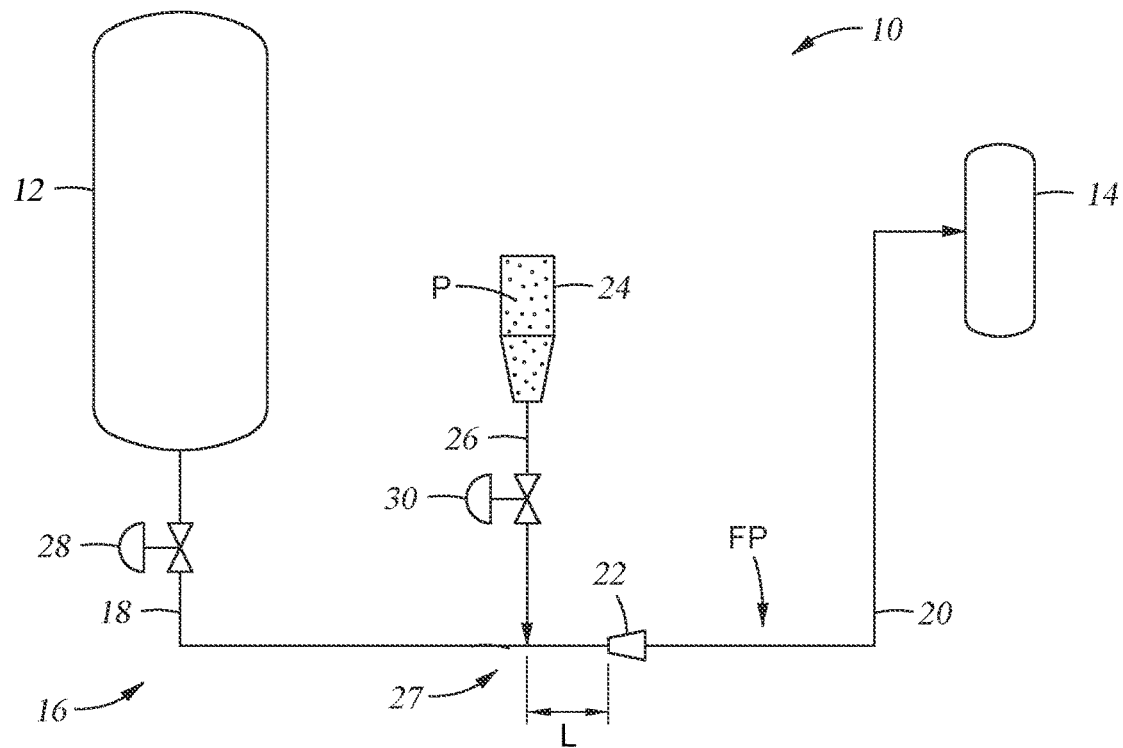
FIG. 1 is a schematic representation of an example of a gas handling system

While the invention will be described in connection with the preferred embodiments, it will be understood that it is not intended to limit the invention to that embodiment. On the contrary, it is intended to cover all alternatives, modifications, and equivalents, as may be included within the spirit and scope of the invention as defined by the appended claims.

DETAILED DESCRIPTION OF INVENTION

The method and system of the present disclosure will now be described more fully hereinafter with reference to the accompanying drawings in which embodiments are shown. The method and system of the present disclosure may be in many different forms and should not be construed as limited to the illustrated embodiments set forth herein; rather, these embodiments are provided so that this disclosure will be thorough and complete, and will fully convey its scope to those skilled in the art. Like numbers refer to like elements throughout. In an embodiment, usage of the term "about" includes +/−5% of a cited magnitude. In an embodiment, the term "substantially" includes +/−5% of a cited magnitude, comparison, or description. In an embodiment, usage of the term "generally" includes +/−10% of a cited magnitude.

It is to be further understood that the scope of the present disclosure is not limited to the exact details of construction, operation, exact materials, or embodiments shown and described, as modifications and equivalents will be apparent to one skilled in the art. In the drawings and specification, there have been disclosed illustrative embodiments and, although specific terms are employed, they are used in a generic and descriptive sense only and not for the purpose of limitation.

Schematically represented in FIG. 1 is an example of a gas handling system 10 where gas from a gas source 12 is routed to a terminal location 14 and along a flow path FP that extends through a piping circuit 16. In this example shown gas source 12 is illustrated as a vessel, alternate embodiments include any source of gas, such as a tank, line, well, compressor, and pump. Terminal location 14 is depicted as a closed vessel; alternatives exist that include an open container, such as a bin, tray, car, trough, conveyer, or any place where the contents flowing through piping circuit 16 are discharged. In the illustrated example piping circuit 16 is tubular and shown made up of segments 18, 20 coupled to and in fluid communication with one another. Segment 18 is illustrated as having an upstream end connected to and in communication with gas source 12 so that gas selectively flows from gas source 12 into segment 18. For the purposes of discussion herein, where segment 18 connects to gas source 12 is referred to as an initial point of the piping circuit 16. A downstream end of segment 18 distal from gas source 12 couples to an upstream end of segment 20 via a swage 22. In the example of FIG. 1, an inner diameter of segment 20 exceeds that of segment 18, and a cross sectional area of the flow path FP between gas source 12 and terminal location 14 changes across swage 22. An inner diameter of an end of the swage 22 that connects to segment 18 is substantially the same as that of the segment 18. Similarly, the opposite end of the swage 22 shown connected to segment 20 has an inner diameter substantially the same as segment 20. In the example of FIG. 1, the inner diameter of the swage 22 increases with distance away from segment 18 and proximate segment 20.

Optionally, the inner diameter of swage 22 is stepped and changes at a discrete location along flow path FP. Examples of gas include any gas or vapor; and in specific examples includes one or more of air, oxygen, hydrogen, nitrogen, hydrocarbons, and the like.

Still referring to the example of FIG. 1, an example of a particle source 24 is schematically illustrated and that selectively contains an amount of particles P. In an embodiment particles P are substantially solid and have a size and density to be flowable within a tubular by addition of a motive gas. Examples of the particles P within particle source 24 include catalysts, polymer particles, additives, and the like. Embodiments exist where the particles P have different sizes, and which vary depending on a particular application. Line 26 of FIG. 1 is depicted having an inlet end connected to particle source 24 and in which the particles P are selectively received, and then conveyed through line 26 to an end distal from particle source 24; which as illustrated connects to segment 18 at intersection 27 shown upstream of swage 22. Particle source 24 is in communication with segment 18 via line 26. Alternate embodiments exist where the particles P are introduced at the initial point or downstream of intersection 27. In a non-limiting example of operation particles P are introduced into piping circuit 16 via line 26 and carried to terminal location 14 by gas flowing through circuit 16. Further illustrated in FIG. 1 are optional control valves 28, 30 shown respectively in segment 18 and line 26, and for controlling the flow of gas and particles through these conveyances means.

In one embodiment, a flow rate of gas from gas source 12 flowing through segment 18 is at a velocity at least as great as a designated pickup velocity so that the particles P from particle source 24 entering segment 18 become dispersed within, and flowable along with, the flow of gas in segment 18, and do not accumulate along a lower surface of the segment 18. In one example of operation, the particles are distributed within the flowing gas in segment 18 and what is referred to as dilute phase conveying. Further optionally, the inner diameter of segment 18 is sized so that an anticipated flow of gas combined with the anticipated rate of particles P within segment 18 make up a stable dilute phase. As noted above, the inner diameter of segment 20 is greater than that of segment 18, and in the illustrated example a velocity of the gas and particles P flowing along flow path FP in segment 20 and downstream of swage 22 is less than that in segment 18. Further in this example, the inner diameter of segment 20 is set at a value so that the particles P flowing within the gas in segment 20 are at a velocity greater than what is referred to commonly as a saltation velocity. In one embodiment, saltation velocity is that at which particles inside of a flow of fluid drop from their suspended state within the flow of fluid and drop to a surface below the flowing fluid. In a non-limiting example, swage 22 is located a distance L downstream from intersection 27 where particles P are introduced into flow circuit. In an example, the distance L is set to be at least a distance of travel after introduction into a flow stream upon which the particles P are no longer accelerating or slipping in the flow stream, but traveling at substantially the same velocity as the carrier gas.

The piping circuit 16 of FIG. 1 with its increase in cross sectional area provides an advantage over known piping circuits that do not have a change in cross sectional area. In an embodiment, by strategically sizing the section where particles P are introduced into piping circuit 16 so that the mixture of gas and particles when flowing through that section of piping circuit 16 are at a velocity above a pick-up velocity of the particles P, the particles P will not collect or rest within the piping circuit 16. A further advantage of the piping circuit 16 is that increasing its cross sectional area downstream of the section where the particles P are introduced limits pressure losses in the piping circuit 16 so that the flow of the mixture of gas and particles P retains sufficient kinetic energy to reach the terminal location 14 at a velocity above the saltation velocity. A yet additional advantage is realized by reducing dynamic loads by maintaining stable dilute phase conveying. Dynamic loads on a transfer system can result in failure of convey piping, supports, structure to where the convey piping is attached to the structure for system only designed for static loads. It is believed it is within the capabilities of one skilled in the art to size the segments 18, 20 so that the particles P being introduced into the piping circuit are introduced into a gas at least as great as a pickup velocity, and that over the length of the piping circuit 16 the velocity of the flow of the mixture of particles and gas is at least that or greater than a saltation velocity. Further, it is within the capabilities of one skilled to size lines to match designated pressure profiles required in the gas handling system 10.

Figure 2:
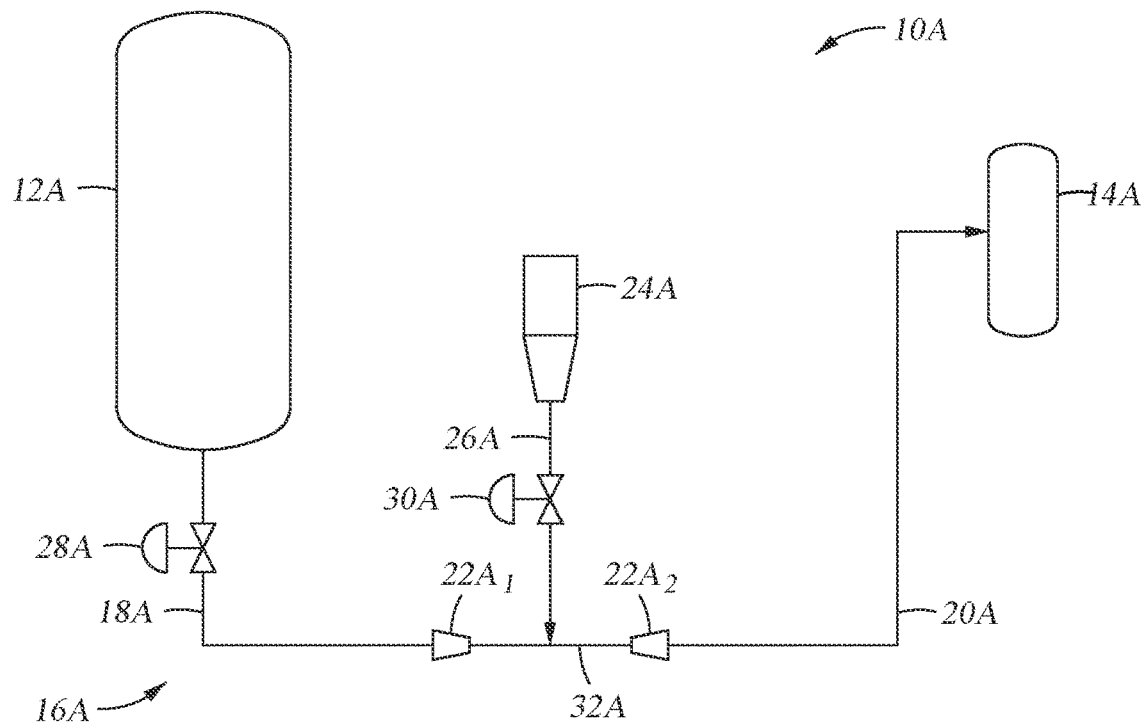
FIG. 2 is a schematic representation of an alternate example of the gas handling system of FIG. 1.

An alternate embodiment of the gas handling system 10A is shown schematically in FIG. 2. In this example, another segment 32A is shown introduced within piping circuit 16A. In this example segment 32A has a diameter and thus area less than that of each of segment 18A, 20A. As such, the velocity of the gas from gas source 12A and flowing through piping circuit 16A and within segment 32A is at least as great as a pickup velocity necessary for particles P being introduced from the particle source 24A. Moreover, in this example, the linear length of segment 32A is less than the length of segment 18 of FIG. 1, so that an overall loss of pressure in the gas through piping circuit 16A can be reduced over that of FIG. 1 and in piping circuit 16. Swages 22A1, 22A2 are shown for providing changes in line sizes between segments 18A and 32A, and segment 32A and segment 20A. Further optional embodiments exist where in lieu of the segment 32A, a localized pipe diameter is reduced, such as through a venturi or other similar local velocity increasing device.

Optional embodiments exist where gas is a gas which examples of which include a processed gas, a mixture of injection gas and a carrier gas. In an alternative the carrier gas and particles are introduced into portion 18, 18A from a process vessel. Examples of processed gases include hydrocarbon gases. A specific example of gas is provided in Table 1 of Example 1 below.

Example

In a non-limiting example of operation, a polypropylene copolymer, with an ethylene content from 3 to 10%, and a particle size of 1.8 mm is conveyed within a flow of gas. Example constituents of the gas flowing in the line include hydrogen, ethylene, ethane, propylene, and propane, and in Table 1 below are values for the mass of the mixture flowing through the line in different simulation cases and the conditions within the pipe at the pickup end. Reflected in the data provided in Table 2 are simulations Case 1 and Case 2; where in Case 1 the pipe diameter from pick-up point to a terminal location is unchanged. In Case 2, the material flow rate and conditions are the same as in Case 1, but the size of cross sectional area in the pipe changes downstream of where the particles are introduced into the pipe. As illustrated in Table 2, the velocity of material flow at the pick-up point is 17.5 m/s, which is at risk of being too low a velocity for satisfactorily conveying particles as it is estimated that a strand phase could develop at a velocity of 17.0 m/s. In Case 2, the pipe diameter where the particles are introduced is less than that of Case 1 and results in a velocity of material flow to be 24.1 m/s; a magnitude of which is deemed sufficient to avoid development of a strand phase. Also in Case 2, at a location downstream of the pick-up point the pipe diameter is increased; which reduces dynamic losses of the material flowing in the pipe so that the pressure at the end of the pipe is at 1.0 Barg.

TABLE 1

|  |  | Simulation Case 1 | Simulation Case 2 |
|---|---|---|---|
| Conveying Mode |  | Dilute Phase | Dilute Phase |
| Conveying mass throughput | Kg/hr | 50000 | 50000 |
| Conveying Pipe I.D. | Mm | 154.1 | 128.2/154.1 |
| Conveying Pipe Length | M | 73.9 | 12.0/61.9 |
| Conveying Pipe Height | M | 52 | 4.7/47.3 |
| No. of Bends |  | 4 | 4 |
| Conveying gas volumetric flow | M3/min | 52.3 | 52.3 |
| Conveying Pressure (at Pick-up) | Barg | 2.21 | 2.36 |
| Conveying pressure (at end) | Barg | 1.0 | 1.0 |
| Gas Velocity (at pick-up) | m/s | 17.5 | 24.1 |
| Gas Velocity (at end) | m/s | 28.0 | 28.0 |
| Solids-to-gas ratio (mass) |  | 16.4 | 16.4 |

The present invention described herein, therefore, is well adapted to carry out the objects and attain the ends and advantages mentioned, as well as others inherent therein. While a presently preferred embodiment of the invention has been given for purposes of disclosure, numerous changes exist in the details of procedures for accomplishing the desired results. For example, additional gas can be added, but implementation of the method and system described minimizes the need for additional gas. These and other similar modifications will readily suggest themselves to those skilled in the art, and are intended to be encompassed within the spirit of the present invention disclosed herein and the scope of the appended claims.

What is claimed is:

1. A piping circuit for conveying particles comprising:
a first segment comprising an intersection where particles dispersed in a first gas combine with a second gas form a mixture, a cross sectional area inside the first segment strategically sized so that when the mixture flows through the first segment the particles are at a velocity at least as great as a pick up velocity of the particles, the intersection comprising a junction where a first pipe carrying the first gas and the particles joins directly with a second pipe carrying the second gas so that the first gas and particles are introduced directly into a flow of the second gas within the second pipe; and
a second segment comprising an upstream end in communication with the first segment, a terminal end distal from the upstream end, and a cross sectional area greater than the cross sectional area of the first segment and strategically sized so that when the mixture flows through the second segment the particles are at a velocity at least as great as a saltation velocity of the particles.

2. The piping circuit of claim 1, wherein the second segment is strategically positioned a length L from the intersection to limit pressure losses of the mixture and so that the mixture retains sufficient kinetic energy to reach the terminal location at a velocity above the saltation velocity.

3. The piping circuit of claim 1, wherein the intersection is in communication with a discharge line from a process vessel, and where in the process vessel comprises the source of the particles.

4. The piping circuit of claim 3, wherein the process vessel comprises a second gas that flows with the particles to the intersection.

5. The piping circuit of claim 1, wherein pressures at the intersection and at the terminal end are fixed, and a flow rate of the gas and particles are fixed, and wherein the cross sectional areas of the first and second segments are sized so that a pressure drop in the first and second segments is no greater than a difference in pressure between fixed pressures.

6. The piping circuit of claim 1, wherein the terminal end is at an elevation greater than the junction.

7. The piping circuit of claim 1, further comprising a particle source, and wherein the particles are stored within the particle source, and wherein the particles are selectively conveyed from the particle source to the first segment through a line that connects between the particle source and the first segment.

8. The piping circuit of claim 1, wherein the second segment is spaced a distance downstream of the intersection so that the particles P are traveling in the second segment at substantially the same velocity as carrier gas in the mixture.

* * * * *